Sept. 20, 1949.　　　　J. C. CROWLEY　　　　2,482,469
AIR BAG STEM

Filed Jan. 30, 1946　　　　　　　　　　　　2 Sheets-Sheet 1

INVENTOR.
JOHN C. CROWLEY
BY
Kwis, Hudson, Boughton Williams
ATTORNEYS

Sept. 20, 1949.  J. C. CROWLEY  2,482,469
AIR BAG STEM

Filed Jan. 30, 1946  2 Sheets-Sheet 2

INVENTOR.
JOHN C. CROWLEY
BY
Kwis, Hudson, Baighton & Williams
ATTORNEYS

Patented Sept. 20, 1949

2,482,469

UNITED STATES PATENT OFFICE 2,482,469

AIR BAG STEM

John C. Crowley, Willoughby, Ohio, assignor to The Dill Manufacturing Company, Cleveland, Ohio, a corporation of Ohio Application January 30, 1946, Serial No. 644,254

3 Claims. (Cl. 18—45)

This invention relates to a stem for an air bag such as is used in the manufacture of pneumatic tire casings.

In manufacturing pneumatic tire casings and other similar rubber articles, air bags are positioned within the tire casings during the curing of the latter and then the air bags are inflated with steam or other heated fluid to provide vulcanizing heat, all as well understood in the art. These air bags are usually constructed of rubber and are provided with metal valve stems vulcanized directly in the material of the bags or vulcanized in a separate piece or block of rubber which, in turn, is vulcanized in the material of the air bag. The steam or other fluid is introduced into the air bag through the valve stem. Consequently the air bag stems are subjected to a high degree of heat which tends to break or destroy the rubber to metal bond or adhesion between the air bag material and the stem, with the result leaks frequently occur between the stem and the bag with the possible destruction of the useful life of the air bag.

The main object of the invention is to provide a stem construction which is so secured to an air bag as to increase the useful life of the air bag.

Another object is to provide a stem for an air bag which is so constructed and is so connected to the bag as to greatly lessen the likelihood of leaks occurring between the air bag and the stem.

A further object is to provide a stem construction for an air bag whereby a tight seal can be effected between the stem and bag, notwithstanding the deterioration of the rubber of the bag because of the heat to which it is subjected and the breaking of the rubber to metal bond between the bag and stem.

A still further object is to provide a stem construction for an air bag whereby the seal between the stem and bag can be tightened from time to time during the use of the bag and from exteriorly thereof by means of a tool inserted through the stem.

Another object is to provide a stem construction for an air bag wherein the parts of the stem are so formed as to have certain surfaces thereof acting to tightly grip or clamp the rubber material in which the stem is mounted and thus to provide an improved seal between the material and the stem.

Further and additional objects and advantages not hereinbefore specified will become apparent during the detailed description of several embodiments of the invention which is to follow.

Referring to the accompanying drawings illustrating several embodiments of the invention, Fig. 1 is a top plan view of an air bag stem molded and vulcanized in a separate mass or block of rubber that is, in turn, united to the material of the air bag by vulcanization.

The air bag itself is not illustrated herein since it is well known in the art. The various forms of stems are shown as mounted in blocks of rubber which in turn are vulcanized in the thick rubber material defining the inner circumference of the air bags as is well understood in the art. It will be understood, however, that the stems could be mounted directly in the material of the air bags if it is desired to do so.

Figure 1:
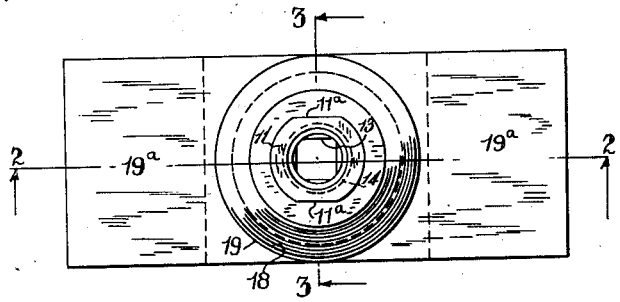
Figure 2:
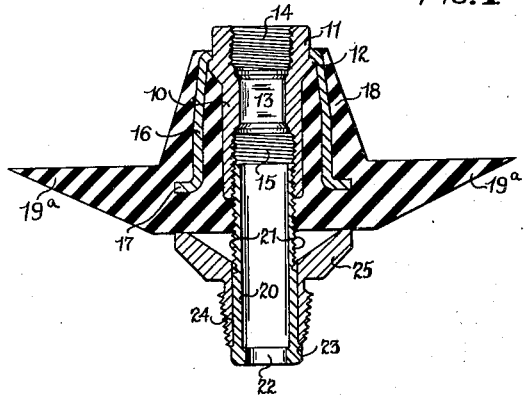
Fig. 2 is a sectional view through the stem and block of rubber and is taken substantially on line 2—2 of Fig. 1 looking in the direction of the arrows.
Figure 3:
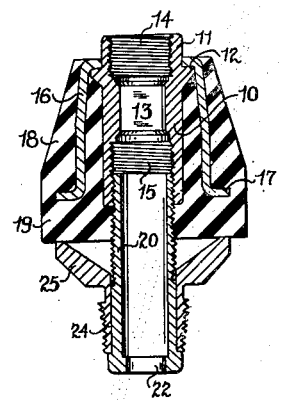
Fig. 3 is a sectional view taken substantially on line 3—3 of Fig. 1 looking in the direction of the arrows.

The stem shown in Figs. 1 to 3 inclusive comprises an outer stem part 10 which is vulcanized in the rubber block or in the air bag material as will be well understood. The outer stem part 10 is provided adjacent its outer end with an enlarged portion 11 that extends to a point exteriorly of the air bag and radially inwardly of the inner circumference of the bag. The portion 11 adjacent its inner end is provided with an exterior annular shoulder 12. The outer stem part 10 has a bore 13 extending therethrough with the outer end thereof threaded as indicated at 14 to have connected to the stem a suitable fitting on a conduit extending from a source of supply of steam or other heated fluid. The bore 13 adjacent its inner end is threaded as indicated at 15 to enable an inner stem part later to be described to be connected to the outer stem part. A metal sleeve 16 is operatively associated with the outer stem part and has its outer end flanged inwardly to overlie and engage the shoulder 12 of the outer stem part, while its inner end is flanged radially outwardly as indicated at 17 for a purpose later to be explained.

The outer stem part 10 and the sleeve 16 are shown as molded in a rubber block having a tapered portion 18 and a portion 19 of constant transverse width. The portion 19 is elongated, as indicated at 19a. It will be understood that the rubber block is molded or vulcanized in the material of the air bag with the elongated portion 19a of the block extending circumferentially of the bag and with the tapered portion 18 of the block located adjacent the inner circumference of the bag.

The sleeve 16 being radially spaced substantially throughout its length from the outer stem part 10 is insulated from said outer stem part by the rubber material that is located intermediate the sleeve and the stem and hence the bond between the outer surface of the sleeve and the rubber material of the block or bag is adversely affected to a minimum extent by heat transmitted thereto from the stem.

The air bag stem also comprises an inner stem part 20 which is externally threaded as indicated at 21, and can be screwed into the threaded portion 15 of the bore 13 of the outer stem part. The inner stem part 20 is tubular and at its inner end is provided with a square opening 22 adapted to receive a suitably shaped wrench inserted through the stem parts, whereby the inner stem part can be turned relative to the outer stem part from exteriorly of the air bag. In this connection it will be noted that the enlarged outer end of the outer stem part 11 is provided with diametrically opposite flats 11a, whereby a tool can be applied to said flats to hold the outer stem part against a tendency to twist while the inner stem part is rotated to interconnect the parts more tightly.

The inner stem part 20 adjacent its inner end is provided with an exterior annular shoulder 23 against which shoulder bears the end of a member, in this instance, a metal collar 24 which rotatably interfits the inner stem part 20. The metal collar 24 at its opposite end is provided with an outwardly flared portion 25 facing toward the outer stem part and the free end of which furnishes an annular flat surface that contacts the flat surface of the rubber block when the stem parts are secured together.

It will be seen that as the inner and outer stem parts are tightly screwed together the flat annular free end of the flared portion 25 of the collar or member 24 tightly presses against the rubber block to clamp the rubber between such end and the flange 17 of the sleeve which is spaced from but aligns with said free end, to press the rubber inwardly about the inner and outer stem parts. Also the engagement between the rubber block and the free end of the flared portion 25 of the member or sleeve 24 imparts tension to the stem parts tending to interlock the threaded connection between said parts and thus prevent the same from separating. It will further be noted that the stem parts during use of the air bag in which the stem is mounted can be tightened relative to each other from time to time to thus keep fully effective the seal between the stem and the air bag. It will also be noted that for any pressure fluid to escape from the air bag between the stem and the rubber material said fluid must follow an elongated or tortuous path.

Figure 4:
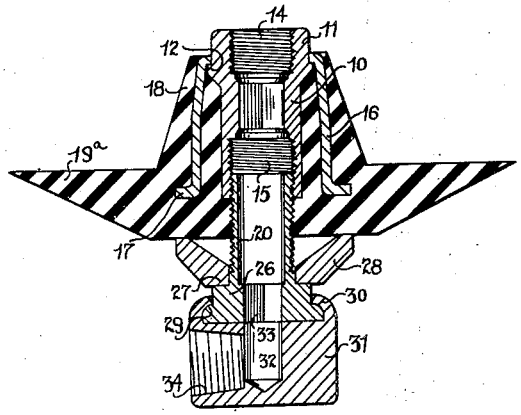
Figs. 4 and 5 are views similar to Figs. 2 and 3 but illustrating a modified stem construction.
Figure 5:
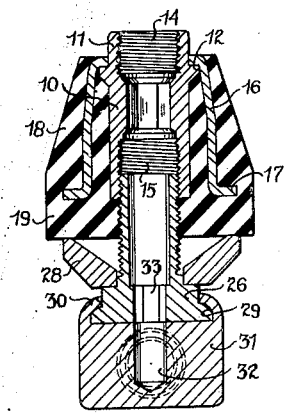

The stem construction shown in Figs. 4 and 5 is very similar to the stem construction shown in Figs. 1 to 3 inclusive and, therefore, identical parts of this modified construction will be identified by the same reference characters and the description thereof need not be repeated herein. In Figs. 4 and 5 the inner end of the inner stem part 20 is enlarged exteriorly as indicated at 26 to provide an exterior annular shoulder 27 adjacent to the rubber block and upon which is seated a flared or conical member 28 comparable to the flared portion 25 of the collar 24 of the previously described form and serving the same purpose.

The enlarged portion 26 at the inner end of the inner stem part 20 is provided with an exterior conical or curved flange 29 over which is inwardly turned a flange 30 of a block 31, wherefore said block 31 and the enlarged inner end 26 of the inner stem part are swively connected together. The block 31 is provided with a bore 32 in axial alignment with the bore through the stem and communicating therewith through the hexagonal wrench receiving opening 33 formed in the enlarged end 26 of the inner stem part. The bore 32 in the block 31 communicates with a laterally extending tapered and threaded opening 34 into which can be screwed a fitting on one end of a short tube that is located within the air bag and the purpose of which is well understood in the art.

Figure 6:
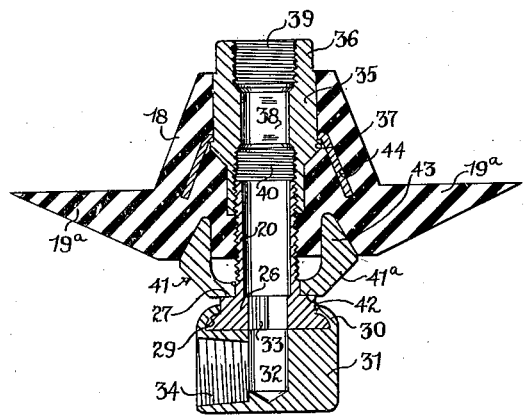
Figs. 6 and 7 are sectional views similar to Figs. 2 to 5 inclusive but illustrating a still different form of stem construction.
Figure 7:
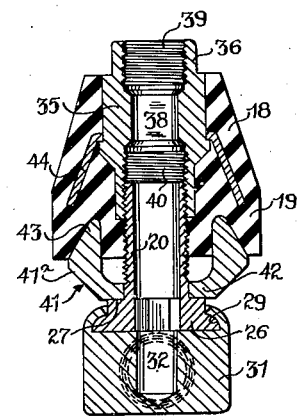

The air bag stem shown in Figs. 6 and 7 comprises an outer stem part 35 having a portion 36 which projects exteriorly of the air bag and inwardly of said portion another portion of thickened wall section and provided with an external annular shoulder 37. The outer stem part 35 is provided with a bore 38 therethrough having at its outer end a threaded portion 39 similar to the threaded portion 14 in the previously described forms of stems and adjacent its inner end a threaded portion 40 into which the inner stem part is screwed. The inner stem part shown in Figs. 6 and 7 is identical with the inner stem part 20 of Figs. 4 and 5 and therefore the same reference characters are applied to designate the corresponding features of this inner stem part. However, in place of the member 28 being mounted upon the shoulder 27 a different form of member is employed. This different member 41 comprises an outwardly flared portion 41a facing toward the outer stem part and formed integral with a radially inwardly extending portion 42 of the member 41 and which latter portion engages the shoulder 27. The outwardly flared portion 41a also has at its free end a cylindrical portion 43 that extends parallel to the stem parts and is of decreasing wall thickness toward the outer stem part to provide a tapered or conical outer surface.

A conical relatively thin metal thimble or sleeve 44 has at its outer end an inturned flange engaging the shoulder or flange 37 of the outer stem part 35 and said sleeve or thimble and the outer stem part are molded or vulcanized in the rubber blocks as clearly indicated. The rubber block preferably is provided with an annular tapered recess or groove complementary to the portion 43 of the member 41 that is carried by the inner stem part and when the inner and outer stem parts are screwed together the portion 43 of the member 41 extends into said recess and the tapered or conical outer surface of the portion 43 acts with the sleeve 44 to tightly grip or clamp the material of the rubber block therebetween and also to bind said material against the stem.

It will be seen that the stem parts can be more tightly screwed together from time to time to maintain the sealing engagement between the rubber material and the metal of the stem to provide, in addition to the adhesion therebetween a good mechanical bond or grip therebetween.

It will also be noted that any pressure fluid seeking to escape between the stem and the material must follow an elongated and tortuous path.

Figure 8:
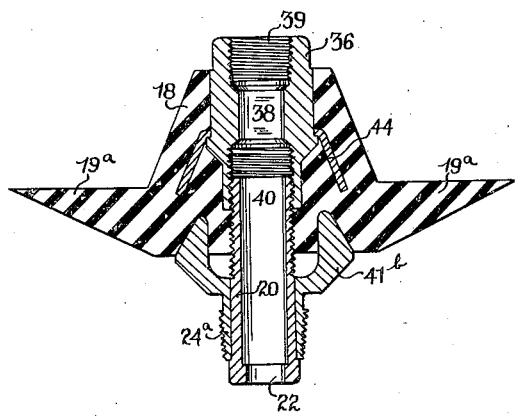
Figs. 8 and 9 are sectional views similar to the previous sectional views but illustrating a still further and different form of stem construction.
Figure 9:
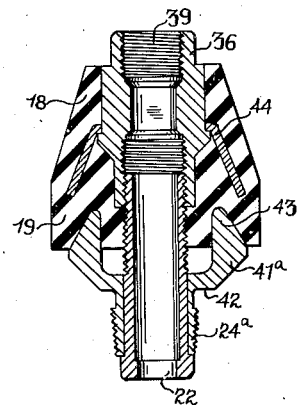

In Figs. 8 and 9 the outer stem part is identical with the outer stem part 35 of Figs. 6 and 7 and the description thereof need not be repeated. Also in Figs. 8 and 9 the inner stem part 20 is identical with the inner stem part described in connection with Figs. 2 and 3 and, therefore, a description of the inner stem part need not be repeated. The inner stem part 20 of Figs. 8 and 9 is provided with a collar or member 24a similar to the collar or member 24 of Figs. 2 and 3. However, the collar 24a in place of having integrally formed therewith the flared or conical portion 25 has integrally formed therewith portions 42, 41a and 43 corresponding to the same numbered portions of Figs. 6 and 7 and functioning for the same purpose.

From the foregoing description of a number of different forms of stem constructions embodying the invention it will be seen that the objects enumerated at the beginning of this specification are fully attained.

Although several embodiments of the invention have been illustrated and described in detail herein it will be understood that the invention is susceptible of various modifications and adaptations within the scope of the appended claims.

Having thus described my invention, I claim:

1. An air bag stem comprising a rubber block adapted to be united with the material of the air bag, a first stem part mounted by said block and having an end located exteriorly of said block and another end located within said block, said first stem part being provided intermediate its ends with an external shoulder and having a bore therethrough which is threaded adjacent the end that is located within said block, a sleeve having a flange contacting said shoulder and being of conical formation with its large end adjacent the end of the first stem part that is within the block, said sleeve and said first stem part being molded in said block with the material of the block filling the space between said sleeve and said first stem part, a second stem part provided with a bore therethrough and having one end externally threaded and screwed into the bore threads of said first stem part, said second stem part having its other end located exteriorly of the block and provided with an external shoulder, a member intermediate said second stem part external shoulder and the exterior of said block and having a portion rotatable on said second stem part and spaced longitudinally on said second stem part from said block and a portion extending from said first portion and spaced radially outwardly of said second stem part and engaging said block.

2. An air bag stem comprising a rubber block adapted to be united with the material of the air bag, a first stem part mounted by said block and having an end located exteriorly of said block and another end located within said block, said first stem part being provided intermediate its ends with an external shoulder and having a bore therethrough which is threaded adjacent the end that is located within said block, a sleeve having a radially inwardly extending flange contacting said shoulder and being of conical formation with its large end adjacent the end of the first stem part that is within the block, said large end of said sleeve being provided with a radially outwardly extending flange, said sleeve and said first stem part being molded in said block with the material of the block filling the space between said sleeve and said first stem part, a second stem part provided with a bore therethrough and having one end externally threaded and screwed into the bore threads of said first stem part, said second stem part having its other end located exteriorly of the block and provided with an external shoulder, a member intermediate said second stem part external shoulder and the exterior of said block and having a portion rotatable on said second stem part and spaced longitudinally on said second stem part from said block and a portion extending from said first portion and spaced radially outwardly of said second stem part and engaging said block and aligned with said radially outwardly extending flange of said sleeve in the longitudinal direction of said stem parts.

3. An air bag stem comprising a rubber block adapted to be united with the material of the air bag, a first stem part mounted by said block and having an end located exteriorly of said block and another end located within said block, said first stem part being provided intermediate its ends with an external shoulder and having a bore therethrough which is threaded adjacent the end that is located within said block, a sleeve having a flange contacting said shoulder and being of conical formation with its large end adjacent the end of the first stem part that is within the block, said sleeve and said first stem part being molded in said block with the material of the block filling the space between said sleeve and said first stem part, a second stem part provided with a bore therethrough and having one end exteriorly threaded and screwed into the bore threads of said first stem part, said second stem part having its other end located exteriorly of the block and provided with an external shoulder, a member intermediate said second stem part external shoulder and the exterior of said block and having a portion rotatable on said second stem part and spaced longitudinally on said second stem part from said block and a portion extending from said first portion and spaced radially outwardly of said second stem part and engaging said block and provided with an end edge extending parallel to said stem parts and of diminishing thickness toward said first stem part to provide a conical surface on said edge, said block being provided with a complementary groove receiving said conical edge of said member portion when said stem parts are interconnected and mounted in said block, wherefore the material of the block is clamped between the conical outer surface of said edge of said member portion and said sleeve and is pressed by said second portion of said member and its edge into tight mechanical contact with the exterior of the second stem part.

JOHN C. CROWLEY.

REFERENCES CITED

The following references are of record in the file of this patent:

UNITED STATES PATENTS

| Number | Name | Date |
| --- | --- | --- |
| 1,570,157 | Knepper | Jan. 19, 1926 |
| 1,927,803 | Mullin | Sept. 19, 1933 |
| 2,218,639 | Crowley | Oct. 22, 1940 |
| 2,318,376 | Crowley | May 4, 1943 |